United States Patent Office 3,103,518
Patented Sept. 10, 1963

3,103,518
2,5-DI-[6'-METHOXYBENZIMIDAZOLE-(2')]-FURAN
Max Duennenberger, Birsfelden, and Adolf Emil Siegrist, Basel, Switzerland, assignors to Ciba Limited, Basel, Switzerland
No Drawing. Filed Jan. 9, 1959, Ser. No. 785,781
Claims priority, application Switzerland Jan. 14, 1958
1 Claim. (Cl. 260—309.2)

In Example 12 of U.S. Patent No. 2,463,264, patented March 1, 1949, by Charles Graenacher et al., is described the manufacture of 2,5-di-[benzimidazyl-(2')]-furan by heating 1,2-diaminobenzene with furan-2,5-dicarboxylic acid in the molecular ratio 2:1 with the exclusion of air and in the presence of a small proportion of boric acid at a temperature of 140–150° C. In this manner good yields are not obtained.

The present invention is based on the observation that very substantially better yields are obtained by raising the reaction temperature to about 200° C. Accordingly, the present invention provides a process for the manufacture of 2,5-[benzimidazyl-(2')]-furans by reacting an ortho-diamine of the benzene series, of which one amino group is primary and the other amino group is at most secondary, with furan-2,5-dicarboxylic acid in an anhydrous medium, and the process is characterized in that the reaction is carried out at a temperature of at least 190° C.

In this manner the known unsubstituted 2,5-di-[benzimidazyl-(2')]-furan can be made from 1,2-diaminobenzene and furan-2,5-dicarboxylic acid. The process is also especially suitable for the manufacture of new 2,5-di-[benzimidazyl-(2')]-furans which contain at least one substituent. Accordingly, the invention also provides compounds which correspond to the formula (1)
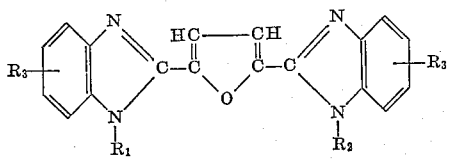

in which $R_1$ and $R_2$ represent hydrogen atoms or substituents, and $R_3$ represents an alkyl group of low molecular weight, such as the ethyl or methyl group, or an alkoxy group of low molecular weight such as the ethoxy or methoxy group.

The new 2,5-di-[benzimidazyl-(2')]-furans containing at least one substituent can be made by heating an ortho-diamine of the benzene series, of which one amino group is primary and the other amino group is at most secondary and which contains an alkyl or alkoxy group of low molecular weight in the benzene nucleus, with furan-2,5-dicarboxylic acid in an aqueous medium, and, when the ortho-diamine used as starting material contains two primary amino groups, if desired, treating the resulting 2,5-di-[benzimidazyl-(2')]-furan with an alkylating, hydroxyalkylating, alkenylating or aralkylating agent.

As stated above, this reaction is advantageously carried out at a temperature of at least 190° C. However, the new dibenzimidazyl-furans can also be obtained, as described for the known compound in U.S. Patent No. 2,463,264, patented March 1, 1949, by Charles Graenacher et al., by reacting the components together at a temperature below 190° C., for example, at about 150° C., but substantially lower yields are obtained.

In general, the two starting materials are advantageously used for the reaction in at least approximately the theoretical proportions, that is to say, that for every molecular proportion of furan dicarboxylic acid there are used 2 molecular proportions, or an amount at most a few percent more or less than 2 molecular proportions, of the diamine. While the reaction can be carried out in a suitable high boiling solvent, this usually leads to less satisfactory results than when the reaction mixture consists solely of the two starting materials and, if desired, a small proportion of boric acid.

The presence of boric acid increases the yield quite considerably. The proportion of boric acid is advantageously about 0.5% to 5% calculated on the total weight of the reaction mixture.

Furthermore, it is of advantage to carry out the reaction in the absence of oxygen (air), for example, in vacuo or advantageously in an inert gas, such as nitrogen.

The procedure may, for example, consist in heating together the two starting materials at about 140 to 150° C. in the presence or absence of boric acid, if desired, after mixing them together in the solid state. The resulting melt is then gradually raised to about 200° C. While thus increasing the temperature, the elimination of water sets in. The period during which the temperature is raised from 140° C. to about 200° C. should not be too long, as otherwise there is a risk of the melt thickening or even solidifying. The reaction is then advantageously completed at a temperature ranging from 200° C. to 230° C. The water liberated during the reaction can be separated, and the progress and termination of the reaction can easily be followed by observing the evolution of steam.

The imidazole compounds so obtained can be isolated from the reaction mixture by the usual known methods. An advantageous method consists in diluting the melt, while still hot, with a high boiling, inert, water-soluble organic solvent, precipitating the imidazole in the form of a salt, which is usually sparingly soluble in water, by adding a dilute mineral acid, for example, sulfuric acid or hydrochloric acid, and then separating the salt from the aqueous solution. From the salt the base can be liberated with the aid of an alkali, such as an alkali metal carbonate or ammonia.

Instead of using as starting materials for the manufacture of the furan compounds substituted at the imidazole nitrogen atoms, for example, those of Formula 1, diamines which contain a secondary amino group, the substituents in question ($R_1$ and /or $R_2$; see above), may be subsequently introduced into 2,5-di-[benzimidazyl-(2')]-furans unsubstituted at the imidazole nitrogen atoms, and one or both of the hydrogen atoms bound to nitrogen may be thus exchanged for substituents.

Like the known 2,5-di-[benzimidazyl-(2')]-furan, the new compounds of the Formula 1 are useful as optical brightening agents for a wide variety of materials, for example, cellulose fibers, such as cotton or rayon of regenerated cellulose, semi-synthetic or fully synthetic fibers such as acetate rayon or polyamide fibers. These dibenzimidazyl-furan compounds are especially useful for application to polyacrylonitrile fibers, on which they produce a brightening effect which is very fast to light. The new dibenzimidazyl-furan compounds having substituted benzene nuclei and corresponding to Formula 1 have the further advantage over the unsubstituted 2,5-di-[benzimidazyl-(2')]-furan that a much smaller proportion thereof is required to brighten cellulosic materials.

The following examples illustrate the invention, the parts and percentages being by weight in the examples, and also in the foregoing description and in the claim:

*Example 1*

108 parts of 1,2-diaminobenzene, 78 parts of pure furan-2,5-dicarboxylic acid and 3 parts of boric acid are stirred for 70 minutes at 142–146° C. in a current of nitrogen. The temperature is then raised within 30 minutes to 210° C., which causes slow elimination of water. The mixture is then stirred for 1 hour at 210 to 220° C.

150 parts of glycol are then added, whereupon the temperature drops to 150° C. Immediately afterwards, 1000 parts of 2 N-hydrochloric acid are added, and the mixture is stirred for ½ hour at 90° C., allowed to cool, suction-filtered, and the filter cake is washed three times with 300 parts of water and then stirred for ½ hour at 70° C. in 2000 parts of water containing 100 parts of ammonia of 30% strength. The yellow condensation product is allowed to cool to room temperature, suction-filtered and washed three times with 300 parts of water. After drying, about 105 parts of the condensation product of the formula

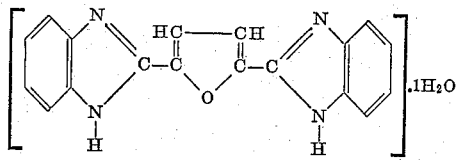

melting at 292.5–294° C. are obtained.

The water of crystallization can be removed by heating the product for 30 minutes at 230° C. under a pressure of 0.01 mm. Hg. The dehydrated product yields the following data.

Calculated: C, 71.99%; H, 4.03%; N, 18.66%.
Found: C, 71.79%; H, 4.18%; N, 18.76%.

When the process described above is performed without the addition of boric acid, the yield obtained is by a few percent lower.

*Example 2*

24.4 parts of 4-methyl-1,2-diaminobenzene, 15.6 parts of furan-2,5-dicarboxylic acid and 0.5 part of boric acid are fused at 145–150° C. in a current of nitrogen. The temperature is then raised to 210–215° C. and the melt is stirred on for 2 hours at this temperature. 40 parts of glycol are then added to the melt, whereupon the temperature drops to 150° C. The melt is cooled to 100° C. and 200 parts of 2 N-hydrochloric acid are added. The mixture is then stirred for ½ hour at 90° C., cooled to room temperature, suction-filtered, and the filter cake is washed three times with 60 parts of water. The filter residue is then stirred for ½ hour at 70° C. in 200 parts of water containing 15 parts of ammonia of 30% strength. The yellow condensation product is allowed to cool to room temperature, suction-filtered and the filter cake is washed three times with 60 parts of water. After drying about 24 parts of a reaction product of the formula

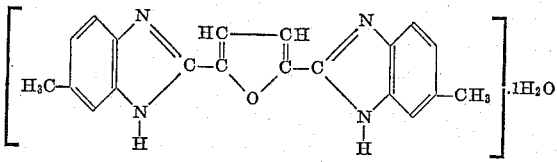

are obtained. After having been recrystallized twice from aqueous ethanol, the product is analyzed and yields the following data.

$C_{20}H_{18}O_2N_4$: Calculated—C, 69.35%; H, 5.24%; N, 16.18%. Found—C, 69.36%; H, 5.42%; N, 16.31%.

*Example 3*

When in Example 2 28 parts of 4-methoxy-1,2-diaminobenzene are used instead of 24.4 parts of 4-methyl-1,2-diaminobenzene, a reaction product results which corresponds to the formula

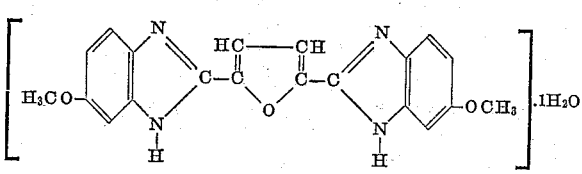

and melts at 178–180° C.

When 4-methyl-1,2-diaminobenzene is replaced in Example 2 by an equivalent amount of 4-chloro-1,2-diamino-benzene, the resulting reaction product is 2,5-di-[6'-chlorobenzimidazyl-(2')]-furan which melts at 306–307.5° C. after having been recrystallized from aqueous ethanol.

*Example 4*

8 parts of 2,5-di-[6'-methyl-benzimidazyl-2')]-furan are dissolved in 50 parts of ethanol of 90% strength containing 4 parts of sodium hydroxide. A solution of 6 parts of dimethyl sulfate in 10 parts of ethanol is then added dropwise at 75° C. in the course of 1 hour. The solution is stirred for another ½ hour at that temperature and then poured into 500 parts of water, and the precipitate is suctioned off and dried, to yield about 6 parts of the compound of the formula

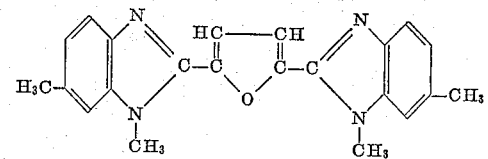

and 2 parts of the compound of the formula

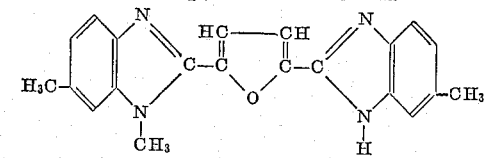

The product substituted at both nitrogen atoms melts at 236–237.5° C., whereas the product substituted at only one nitrogen atom melts at 272–272.5° C.

*Example 5*

15 parts of 2,5-di-[benzimidazyl-(2')]-furan are dissolved in 80 parts of ethanol of 90% strength containing 8 parts of sodium hydroxide. A solution of 12.5 parts of dimethyl sulfate in 10 parts of ethanol is then stirred in at 75° C. dropwise in the course of 2 hours. The temperature of 75° C. is maintained for another hour, the solution is poured into 1000 parts of water, the precipitate is suctioned off and dried and yields about 14 parts of the compound of the formula

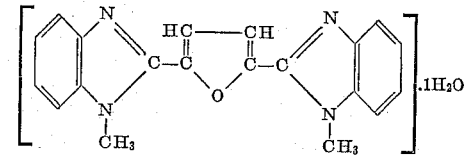

After having been recrystallized three times from aqueous ethanol, the product melts at 146–147° C. and gives the following analytical data.

$C_{20}H_{18}ON_4$: Calculated — C, 69.35%; H, 5.24%.
Found—C, 69.24%; H, 4.95%.

*Example 6*

10 parts of 2,5-di-[benzimidazyl-(2')]-furan are dissolved in 70 parts of ethanol of 90% strength containing 8 parts of sodium hydroxide. A solution of 6 parts of 1-chloro-2,3-di-hydroxypropane in 10 parts of ethanol is then stirred in dropwise at 75° C. in the course of 2 hours. The temperature of 75° C. is maintained for another hour, and the solution is then poured into 500 parts of water, and the precipitate is suctioned off and dried, to yield about 12 parts of the condensation product of the formula

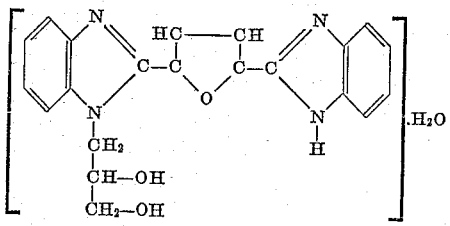

After having been recrystallized three times from aqueous ethanol, the product melts at 290.5–291° C. and gives the following analytical data.

$C_{21}H_{20}O_4N_4$: Calculated—C, 64.21%; H, 5.13%; N, 14.37%. Found—C, 64.58%; H, 5.50%; N, 14.28%.

*Example 7*

When in Example 6, 11 parts of 2,5-di-[6'-methyl-benzimidazyl-(2')]-furan are used instead of 10 parts of 2,5-di-[benzimidazyl-(2')]-furan, the condensation yields about 14 parts of the product of the formula

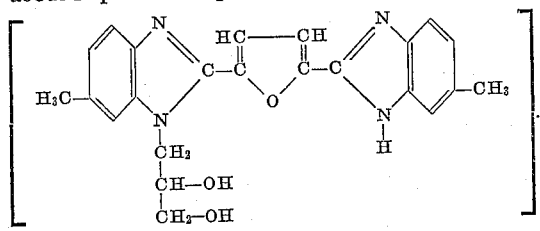

melting at 180–182° C.

*Example 8*

When in Example 6, 6 parts of 1-chloro-2-hydroxy-propane are used instead of 6 parts of 1-chloro-2,3-dihydroxypropane, the condensation yields about 11 parts of the compound of the formula

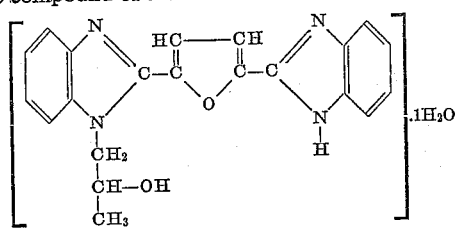

melting at 150–151° C.

*Example 9*

When in Example 6, 13 parts of 1 bromo-propylene-(2) are used instead of 6 parts of 1-chloro-2,3-dihydroxypropane, the condensation yields primarily about 15 parts of the compound of the formula

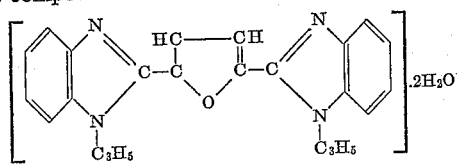

After having been recrystallized five times from aqueous dimethyl formamide, the product melts at 298.5–300° C. and yields the following analytical data.

$C_{24}H_{24}O_3N_4$: Calculated—C, 69.24%; H, 5.77%. Found—C, 69.22%; H, 5.60%.

*Example 10*

15 parts of 2,5-di-[benzimidazyl-(2')]-furan are dissolved in 80 parts of ethanol of 90% strength containing 8 parts of sodium hydroxide. At the boiling temperature of ethanol a solution of 6 parts of 1-chloro-2-hydroxyethane in 10 parts of ethanol is added dropwise in the course of 1½ hours. The solution is stirred for ½ hour at 70° C. and then poured into 500 parts of water. The precipitated condensation product is suctioned off and dried, to yield about 16 parts of the compound of the formula

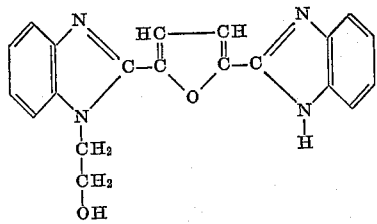

After having been recrystallized three times from aqueous ethanol, the product melts at 182–182.8° C.

$C_{20}H_{16}O_2N_4$: Calculated—C, 69.75%; H, 4.68%; N, 16.27%. Found—C, 69.80%; H, 4.66%; N, 16.49%.

*Example 11*

24.4 parts of 4-methyl-1,2-diaminobenzene, 15.6 parts of furan-2,5-dicarboxylic acid and 0.5 part of boric acid are fused at 145 to 150° C. in a current of nitrogen; the temperature is then raised to 150–155° C. and the melt is stirred on until it has thickened. 10 parts of dimethyl formamide are then added, and the mixture is maintained for 30 hours at 150° C., cooled to 100° C., 200 parts of 2 N-hydrochloric acid are added, and the mixture is worked up as described in Example 2. The reaction product obtained in this manner is in every respect identical with the product described in Example 2.

*Example 12*

50 parts of polyacrylonitrile fiber fabric are treated for 30 minutes at 85–95° C. in a bath containing 1500 parts of water, 3 parts of formic acid of 85% strength, 3 parts of sodium chlorite and 0.005 part of the compound obtained as described in Example 5, then rinsed and dried. The material treated in this manner has a higher white content than identical material treated without the addition of the compound according to Example 5.

A similar effect is achieved when yarn of heat-stable polyvinyl chloride fiber is so treated.

Instead of the compound of Example 5 may be used a dibenzimidazyl-furan compound prepared as described in the preceding examples.

*Example 13*

Cotton, acetate rayon or polyamidic fibers are washed at a goods-to-liquor ratio of 1:30 for ½ hour at 50° C. in a liquor which contains per liter 5 parts of a soap containing 0.1% of one of the furan compounds prepared as described in any one of Examples 1 to 11. The material is then rinsed and dried. Material treated in this manner has a higher white content than identical material treated without addition of the furan compound mentioned.

*Example 14*

100 parts of cotton are treated for ½ hour in a bath containing in 3000 parts of water 2 parts of sodium 2-heptadecyl-N-benzyl-benzimidazole disulfonate and 0.1 part of 2,5-di-[6'-methyl-benzimidazyl-(2')]-furan obtained as described in Example 2, which compound is advantageously added to the dyebath in the form of an alcoholic solution. The cotton is then rinsed in cold water and dried. To achieve a similarly good brightening effect on cotton with unsubstituted 2,5-di-[benzimidazyl-(2')]-furan, a much larger proportion thereof is required.

Instead of 2,5-di-[6'-methyl-benzimidazyl-(2')]-furan may be used with similar effect the furan compounds substituted in the benzene nuclei, prepared as described in Example 3, 4 or 7.

What is claimed is:

The 2,5-di-[benzimidazyl-(2')]-furan which corresponds to the formula

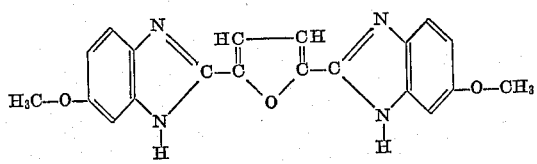

References Cited in the file of this patent

UNITED STATES PATENTS

| | | |
|---|---|---|
| 2,711,415 | Cottle et al. | June 21, 1955 |
| 2,773,869 | Leavitt | Dec. 11, 1956 |
| 2,808,407 | Ackermann et al. | Oct. 1, 1957 |